United States Patent
van den Bogert et al.

(10) Patent No.: US 11,191,694 B2
(45) Date of Patent: Dec. 7, 2021

(54) EXOSKELETON SYSTEM

(71) Applicant: Cleveland State University, Cleveland, OH (US)

(72) Inventors: Antonie J. van den Bogert, Cleveland Heights, OH (US); Daniel Miller, Cleveland, OH (US); Ryan Doris, Olmsted Falls, OH (US); Robert Moody, Lakewood, OH (US); Donald Grimes, Jr., Cleveland, OH (US)

(73) Assignee: CLEVELAND STATE UNIVERSITY, Cleveland, OH (US)

( * ) Notice: Subject to any disclaimer, the term of this patent is extended or adjusted under 35 U.S.C. 154(b) by 216 days.

(21) Appl. No.: 16/398,558

(22) Filed: Apr. 30, 2019

(65) Prior Publication Data
US 2019/0328605 A1 Oct. 31, 2019

Related U.S. Application Data

(60) Provisional application No. 62/664,307, filed on Apr. 30, 2018.

(51) Int. Cl.
*A61H 3/00* (2006.01)
*A61H 1/02* (2006.01)

(52) U.S. Cl.
CPC .......... *A61H 3/00* (2013.01); *A61H 1/0262* (2013.01); *A61H 2003/007* (2013.01); *A61H 2201/1238* (2013.01); *A61H 2201/165* (2013.01); *A61H 2201/1642* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,155,994 A | * | 12/2000 | Hubbard | A61H 1/02 482/134 |
| 2007/0054777 A1 | * | 3/2007 | Kawai | A63B 23/04 482/1 |
| 2018/0325713 A1 | * | 11/2018 | Gregg | A61H 3/00 |
| 2020/0069441 A1 | * | 3/2020 | Larose | F16D 37/02 |

* cited by examiner

*Primary Examiner* — Yashita Sharma
(74) *Attorney, Agent, or Firm* — Fay Sharpe LLP

(57) ABSTRACT

An exoskeleton system is passively powered and pneumatically operated. The system may be a lower-limb system for walking gait restoration. The system may include a first linear actuator located in front of an upper leg section and a second linear actuator located behind a lower leg section.

20 Claims, 4 Drawing Sheets

EXOSKELETON SYSTEM

The present application claims priority to U.S. provisional patent application Ser. No. 62/664,307, filed Apr. 30, 2018, which is incorporated by reference herein in its entirety.

BACKGROUND

Exoskeletons can restore walking in persons with severe disabilities such as multiple sclerosis, stroke, or spinal cord injury. Current options are almost exclusively "active", meaning they use batteries, motors, and control systems. Active devices are expensive ($50,000-$100,000) and are intended for users who are completely paralyzed. In patients with some residual ability, these devices do not improve performance, and could even have an "anti-therapeutic" effect because they function better when the patient remains passive.

Simple passive braces (e.g. ankle-foot orthosis, AFO) are technically passive exoskeletons and commonly used in patients with mild disabilities. They are very cheap and can store elastic energy, but do not provide coupling between joints.

A reciprocal gait orthosis (RGO) provides coupling between two hip joints such that one leg moves forward when the other moves backward, relative to the pelvis. They force the user into a somewhat unnatural gait where the flexion and extension movements occur at the same speed. RGOs are typically used in severe disabilities and do not restore normal gait. The coupling is done by a cable, which is rigid and does not provide energy storage and does not allow any deviation from the prescribed path.

Patients with intermediate disabilities are presently not served well. Most current exoskeletons are actively powered and very expensive. For patients who can stand but not swing their leg forward, there is only the Kickstart orthosis, priced at about $7,000. Kickstart is a passive exoskeleton with springs, pulleys, and cables and has been described in U.S. Pat. No. 7,549,969 and U.S. Pat. Pub. No. 2012/0271207. This is a passive mechanism which couples the hip and ankle joint with a cable and spring. In Kickstart, the torque is associated with a tensile force from top to bottom of the exoskeleton. High torque will cause buckling unless the exoskeleton is very heavy and stiff. This is why Kickstart is designed with rather low torque capability of about 10 N-m, based on 20-25 lbs peak tensile force as disclosed in U.S. Pat. Pub. No. 2012/0271207. Normal walking requires a peak torque of 150 Nm in the ankle. In Kickstart, the cable is slack for part of the gait cycle. The slack-taut transition feels jerky and may disrupt the user's control of walking.

Several active pneumatic exoskeletons have been described. These all require an energy source in the form of compressed air. They use impedance control, and this requires that they control pressure and air is delivered from outside. Several labs have developed exoskeletons with Pneumatic Air Muscles (also known as McKibben muscles). These actuators have elastic properties that are similar to human muscles. However, they are always externally powered, not passive, and not portable due to the required supply of compressed air.

It would be desirable to develop new passive exoskeleton systems with higher torque capacity and smoother operation.

BRIEF DESCRIPTION

Disclosed in some embodiments is an exoskeleton system; wherein the system is powered passively; and wherein the system is operated pneumatically.

The exoskeleton system may include a first actuator configured on a first side of a first portion of a user; and a second actuator configured on a second side of a second portion of the user.

In some embodiments, the first portion is an upper leg portion and the second portion is a lower leg portion.

The first side may be a front side and the second side may be a rear side.

Disclosed in other embodiments is a lower-limb exoskeleton system including: a hip or thigh belt; a foot plate; an ankle fixture extending from a rear of the foot plate; a calf brace link comprising: an inner leg section extending upward from an inner section of the foot plate; an outer leg section extending upward from an outer section of the foot plate; and an arced rear section connected to upper portions of the inner leg section and the outer leg section; a thigh link extending between the hip or thigh belt and an upper portion of the outer leg section; a first linear actuator located between the hip or thigh belt and the thigh link; a second linear actuator located between the ankle fixture and the rear section of the calf brace link; and tubing connecting the first linear actuator and the second linear actuator; wherein the lower-limb exoskeleton system does not comprise any battery, motor, or controller.

The hip or thigh belt may include a front portion and a rear portion.

In some embodiments, the foot plate and the ankle fixture are a unitary structure.

In other embodiments, the foot plate and the ankle fixture are connected via at least one fastener.

At least one of the hip or thigh belt, the foot plate, the ankle fixture, the calf brace link, and the thigh link may contain an aluminum alloy.

In some embodiments, each of the hip or thigh belt, the foot plate, the ankle fixture, the calf brace link, and the thigh link includes an aluminum alloy.

The aluminum alloy may be 6061 aluminum.

In some embodiments, the tubing includes a first tube extending between a top end of the first linear actuator and a bottom end of the second linear actuator.

The tubing may include a second tube extending between a top end of the second linear actuator and a bottom end of the first linear actuator.

In some embodiments, the system further includes at least one pressure gauge in fluid communication with the tubing.

Some embodiments may include a first pressure gauge in fluid communication with the first tube and/or a second pressure gauge in fluid communication with the second tube.

In some embodiments, the hip or thigh belt is a hip belt. In other embodiments, the hip or thigh belt is a thigh belt.

Each of the first linear actuator and the second linear actuator may be mounted to a rod side pin mount on a first end and a clevis mount on a second end.

Disclosed in further embodiments is an exoskeleton system for a limb with a hinge joint. The exoskeleton system includes an upper securing element for securing the system to the limb above the hinge joint; a lower securing element for securing the system to the limb below the hinge joint; a hinged connector between the upper securing element and the lower securing element, the hinged connector comprising an upper connecting element, a lower connecting element, and a hinge connecting the upper connecting element to the lower connecting element; a first actuator located above the hinge and comprising a first chamber and a second chamber; and a second actuator located below the hinge and comprising a third chamber and a fourth chamber. The first chamber is in fluid communication with the third chamber via a first tube. The second chamber is in fluid communication with the fourth chamber via a second tube. The first chamber, the third chamber, and the first tube define a first gas volume. The second chamber, the fourth chamber, and the second tube define a second gas volume.

In some embodiments, the exoskeleton system further includes at least one check valve. The check valve may permit ambient flow into but not out of the first gas volume and the second gas volume. The at least one check valve may include a first check valve associated with the first gas volume and a second check valve associated with the second gas volume.

In some embodiments, the first gas volume and the second gas volume are connected by a double-acting cylinder with a spring-loaded piston.

In some embodiments, the first gas volume and the second gas volume are connected by an elastic diaphragm.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
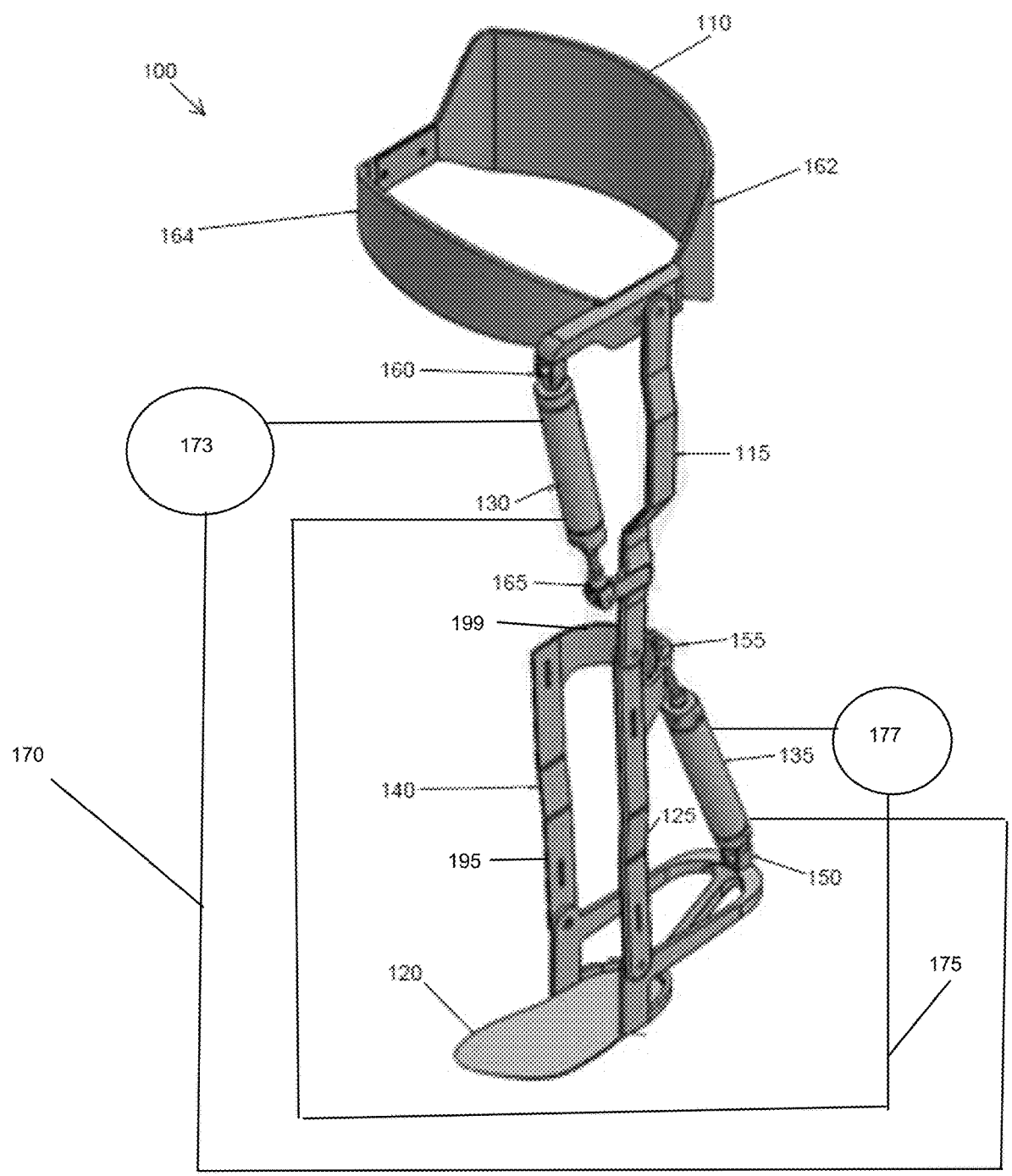
FIG. 1 is a perspective view of one embodiment of an exoskeleton system in accordance with some embodiments of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a long-term solution to restoring the walking gait of persons with neurological disabilities, including, but not limited to multiple sclerosis, strokes, partial spinal cord damage, and cerebral palsy.

The disclosed therapeutic devices may help to restore proper walking gait functions after an accident or sudden injury.

The disclosed systems are passive (i.e., are not powered by any external energy source).

The disclosed systems are pneumatic and can produce a larger torque output than existing cable-driven mechanical systems. Electric motor systems have the capability to passively transfer energy between joints, but their high speed requires a gearbox which introduces friction and inertia (rotor inertia multiplied by gear ratio squared). Pneumatic systems are direct drive, and do not feel "robotic".

Systems with springs and cables are prone to buckling and the sudden appearance of tension feels "jerky".

The systems will effectively assist walking in disabled individuals, for a fraction of the price of an active exoskeleton.

The systems will serve patients that have needs that are in between simple braces and complex active exoskeletons.

The device is passive in nature yet transfers a substantial amount of torque to the user. In some embodiments, the amount is approximately 50 N-m or greater, or about ⅓ or greater of what is necessary during a walking gait cycle. This has not been done before in a passive device which couples the hip and ankle joints.

In some embodiments, two linear actuators are attached to an exoskeleton/sequence of braces. The first is located in front of the wearer's thigh (some optimal distance away, as dictated by the calculated hip moment arm). A second is located behind the wearer's calf (also some optimal distance away, as dictated by the calculated ankle moment arm). The top of the calf actuator is connected with the bottom of the thigh actuator through tubing rated for high pressures. A valve stem and pressure gauge are also connected to this tubing in order to pressurize this portion of the device to its optimal initial pressure. Likewise, the top of the thigh actuator is connected with the bottom of the calf actuator. Another valve stem and pressure gauge are attached in series with this tubing. Optimal initial pressures were calculated for both portions of the system.

The actuators may be linear pneumatic actuators.

In some embodiments, each actuator has two sides: below and above the piston. A first tubing connects one side of the first actuator to one side of the second actuator and a second tubing connects the other side of the first actuator to the other side of the second actuator.

Which sides are connected can depend on how the actuator is mounted (piston rod up or down).

In some embodiments, the first tubing connects the top side of the first actuator to the top side of the second actuator and the second tubing connects the bottom side of the first actuator to the bottom side of the second actuator. In other embodiments, the first tubing connects the top side of the first actuator to the bottom side of the second actuator and the second tubing connects the bottom side of the first actuator to the top side of the second actuator.

As the wearer steps forward with one leg, the other leg will slowly rotate forward over the planted foot. During that rotation, the actuator behind the calf will see its piston extend. This will force air from the bottom of the calf actuator into the "top" of the thigh actuator, forcing the thigh actuator's piston to compress. This builds up a passive torque in both joints, which pulls the ankle towards plantarflexion and the hip towards flexion. When the ankle torque is large enough, it lifts the heel and the hip actuator effectively "pulls" the wearer's leg into the swing phase of the gait cycle.

The system performance depends on several design parameters, which were adjusted to provide maximal assistance to a normal walking movement. Testing on an able-bodied human subject showed that less muscle activation was needed to walk when the actuators were used.

Versions for other applications can be designed based on the same concept and the same design optimization approach:
- more complex arrangements, including the knee joint, and joints in the other leg;
- passive prosthetic devices; and
- passive exoskeletons to assist lifting, use of heavy power tools, etc.

Compared to other pneumatic systems, the systems of the present disclosure do not require a power source, valves, or a control system, making them much less expensive as well as making a portable system feasible.

Compared to all other pneumatic systems, the systems of the present disclosure are fully passive, and the user has complete control. The systems can react exclusively to what the user does in some embodiments. This transparency ensures safety and effective learning by the user.

No commercial pneumatic exoskeletons exist yet, probably because a compressor, or cylinder with compressed air, would be too heavy for a wearable system. This was already recognized in U.S. Pat. No. 4,557,257 where the compressor and control system were located in a wheeled walker.

FIG. 1 illustrates a first embodiment of a lower limb exoskeleton system 100 in accordance with some embodiments of the present disclosure. The system 100 includes a hip belt 110 and a foot plate/ankle fixture 120. In some embodiments, a thigh belt may be used in addition to or in place of the hip belt 110.

A thigh link 115 extends downward from the hip belt 110 and a calf brace 140 extends upward from the foot plate/ankle fixture 120. The calf brace 140 includes calf link/outer leg section 125 which is connected to the thigh link 115 via a joint to permit the hinging of the knee joint. The calf brace 140 further includes inner leg section 195 and arced rear section 199.

A first actuator 130 is located above the joint and in front of the thigh link 115. The first actuator 130 is connected via clevis mount 160 and rod side pin mount 165.

A second actuator 135 is located below the joint and behind the calf link 125. The second actuator 135 is connected via clevis mount 150 and rod side pin mount 155.

Tubing may be included to fluidly connect the actuators 130, 135. The tubing may include a first tube 170 and a second tube 175. A first pressure gauge 173 may be in fluid communication with the first tube 170 and a second pressure gauge 177 may be in fluid communication with the second tube 175. The first tube may be connected to the first actuator 135 to fluidly connect a first (e.g., upper) chamber thereof to a third (e.g., lower) chamber of the second actuator 135. The second tube may be connected to the first actuator 135 to fluidly connect a second (e.g., lower) chamber thereof to a fourth (e.g., upper) chamber of the second actuator 135. The actuators may be configured with elastic diaphragms or double-acting cylinders with spring-loaded pistons to connect a first gas (e.g., air) volume defined by the first tube, the first chamber, and the third chamber to a second gas (e.g., air) volume defined by the second tube, the second chamber, and the fourth chamber.

One or both of the gas volumes may be pressurized by one or more check valves that permit ambient air to flow in but not out. The check valve(s) may be configured to open when the pressure on a side of the system drops below a threshold value (e.g., atmospheric pressure, a predetermined value above atmospheric pressure, a predetermined value below atmospheric pressure).

Figure 2:
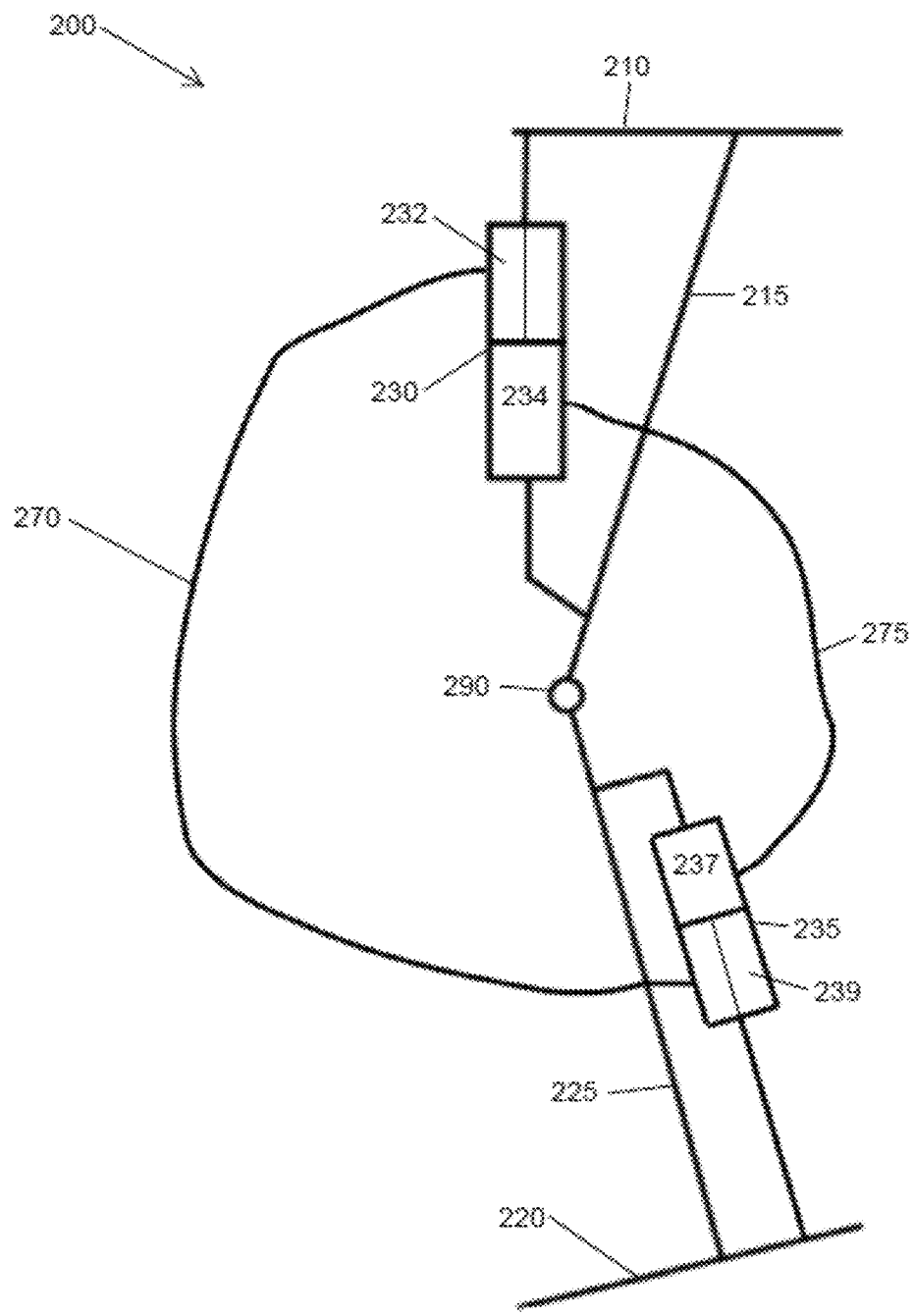
FIG. 2 schematically illustrates an exoskeleton system in accordance with some embodiments of the present disclosure.

FIG. 2 schematically illustrates an exoskeleton system 200 for a hinge joint (e.g., knee, elbow, ankle). The system 200 includes a first or upper securing element 210 for securing the system to a patient's limb above a hinge joint and a second or lower securing element 220 for securing the system to the limb below the hinge joint. A hinged connector is included to connect the first and second securing elements 210, 220. The connector includes a first or upper connecting element 215 extending downward from the first securing element 210 and a second or lower connecting element 225 extending upward from the second securing element 220. The first and second connecting elements 215, 225 are connected at a joint 290 which permits hinging of the limb in use.

The system 200 further includes a first or upper actuator 230 and a second or lower actuator 235. The first actuator 230 includes first or upper chamber 232 and second or lower chamber 234. The second actuator 235 includes third or upper chamber 237 and fourth or lower chamber 239.

A first tube 270 connects a chamber of the first actuator 230 to a chamber of the second actuator 235. A second tube 275 connects a chamber of the first actuator 230 to a chamber of the second actuator 235. In the depicted embodiment, the first tube 270 provides fluid communication between the first or upper chamber 232 of the first actuator 230 and the fourth or lower chamber 239 of the second actuator 235; and the second tube 275 provides fluid communication between the second or lower chamber 234 of the first actuator 230 and the third or upper chamber 237 of the second actuator 235.

It is also possible that the exoskeleton system is quasi-passive. As used herein, "quasi-passive" indicates that an actuator (e.g., an electromechanical actuator) is used in conjunction with a control system to tune the system to a different walking speed. In these embodiments, the two air volumes may be connected by a double acting cylinder where the piston is positioned by an electromechanical actuator and a control system. The actuator may be used to alter the static setpoint (stiffness) of the system and it could have very low power and a low speed and take time (e.g., several seconds) to move to a new position. An example of a quasi-passive assistive device is disclosed in U.S. Pat. No. 10,226,361, the contents of which are incorporated by reference herein.

The design team successfully optimized the device by creating a mathematical model of the gas springs within the system 200 of FIG. 2. To make the model accurate and comparable to an adult's walking gait, real time lower limb joint torques and angles for 12 different subjects were acquired from Dr. Antonie van den Bogert's paper "A real-time system for biomechanical analysis of human movement and muscle function" (Medical and Biological Engineering and Computing, 2013). The hip and ankle angles were used as inputs to the model, allowing one to view the torque output as the model followed the same angle motion as an adult human. The mathematical model of the system can be seen as follows:

$$V1ankle = V10a + (Apiston - Arod) * Ra * Phi1 \quad \text{Equation 1}$$

$$V2ankle = V20a - Apiston * Ra * Phi1 \quad \text{Equation 2}$$

Equations 1 and 2 accurately predict the volume in the two sections of the actuator in the ankle throughout the gait cycle. Note how the variable is dependent on the angle Phi1 of the ankle, where plantarflexion is defined to be positive. V1ankle is the section of the actuator nearest the foot, while V2ankle is the section closest to the knee. Design parameters of the mechanism are: V10a (the volume on side 1 of the ankle actuator when ankle angle is zero), V20a (the volume on side 2 of the ankle actuator when ankle angle is zero, Apiston (the cross-sectional area of the piston), Arod (the cross-sectional area of the piston rod), and Ra, the distance between the ankle joint and the center of the actuator. V20a is equal to the total volume of the cylinder that is used, minus V10a.

$$V1hip = V10h + (Apiston - Arod) * Rh * Phi2 \quad \text{Equation 3}$$

$$V2hip = V20h + Apiston * Rh * Phi2 \quad \text{Equation 4}$$

Equations 3 and 4 accurately predict the volume in the two sections of the actuator in the hip throughout the gait cycle. Note how the variable is dependent on the angle Phi2 of the hip, where flexion is defined to be positive. V1hip is the section of the actuator nearest the trunk of the body, while V2hip is the section closest to the knee.

$$V1total = V1ankle + V1hip + V1tube \quad \text{Equation 5}$$

$$V2total = V2ankle + V2hip + V2tube \quad \text{Equation 6}$$

Equations 5 and 6 sum up the various volumes on either side of the system and created two main volumes. V1tube and V2tube are design parameters representing the interior volume in the tubing between the two actuators.

$$P1 = P10 * (V10a + V10h + V1tube) / V1total \quad \text{Equation 7}$$

$$P2 = P20 * (V20a + V20h + V2tube) / V2total \quad \text{Equation 8}$$

Equations 7 and 8 calculate the pressure on the first and second sides of the system, based on the ideal gas law and the assumption of constant temperature. The design parameters P10 and P20 are the pressures on side 1 and side 2 when the joint angles are zero. When the pressure decreases on one side and increases in the other, the pressure difference causes a force to act on the pistons in the actuators. This can be seen in equations 9 and 10 below:

$$Fa = -P2 * Apiston + P1 * (Apiston - Arod) \quad \text{Equation 9}$$

$$Fh = -P2 * Apiston + P1 * (Apiston - Arod) \quad \text{Equation 10}$$

Fa represents the Force that the ankle actuator is outputting, while Fh represents the output force of the hip actuator. The Output Forces were then multiplied by the moment arms Ra and Rh to find the corresponding moment at each joint.

$$Ma = Fa * Ra \quad \text{Equation 11}$$

$$Mh = Fh * Rh \quad \text{Equation 12}$$

As previously mentioned, the torque outputs for adult males were acquired from Dr. Antonie van den Bogert (Medical and Biological Engineering and Computing, 2013). At this point Both the output torques of the bare subject and the theoretical output torque of the design are known for all points in the gait cycle. Assuming the subject dons the device, while walking the device should apply torque towards the needed torque, minimizing the required torque by the subject. By subtracting the two, this theoretical residual joint torque can be found for all points in the gait cycle.

$$ResidualTorque = SubjectMoment - ExoMoment \quad \text{Equation 13}$$

Where ResidualTorque, SubjectMoment and ExoMoment are a 2×100 matrix, with the first column representing ankle, the second column representing hip, and each row representing a point in the gait cycle. Finally, the average of the rows and columns of ResidualTorque was taken to get one final Value, Cmom.

$$Cmom = mean(mean(abs(ResidualTorque))) \quad \text{Equation 14}$$

Cmom is the total effort required from the human body to move the hip and ankle joints throughout one full gait cycle. Design parameters should be chosen to minimize this value.

This was accomplished by use of the optimization toolbox within MATLAB. The Function fmincon takes an initial guess for the design parameters and runs through a set of equations (1 through 14), slightly varying the parameters guided by the gradient of Cmom with respect to the design parameters.

Design parameters were found by minimizing the Cmom value for the walking movements described in van den Bogert (2013), where subjects walked at speeds between 0.9 and 1.0 m/s. The optimization was done for actuators with a cylinder volume of 174 ml, Apiston=1149 mm squared and Arod=97 mm squared. The optimal design is not unique and depends on the bounds that are placed on certain parameter values. An example of optimal design parameters is: Ra=150 mm, Rh=50 mm, V10a=56 ml, V10h=90 ml, P10=1.08 MPa, P20=1.14 MPa, V1tube=173 ml, V2tube=995 ml.

Before operating the device, it is inflated while both joints are held at zero degrees. Side 1 must be inflated to the pressure value of P10 and side 2 must be inflated to the pressure value of P20.

To confirm that the pressures are acting in accordance with the design, the two pressures were plotted over the gait cycle. It was observed that as one pressure increases, the other decreases. The non-linearity of the gas springs causes the pressures to not be mirror images of each other.

Although in FIG. 2 the upper volume of the first actuator is fluidly connected to the lower volume of the second actuator via a first tube and the lower volume of the first actuator is fluidly connected to the upper volume of the second actuator via a second tube, other configurations are also contemplated. Other piston rod configurations are also contemplated.

Figure 3A:
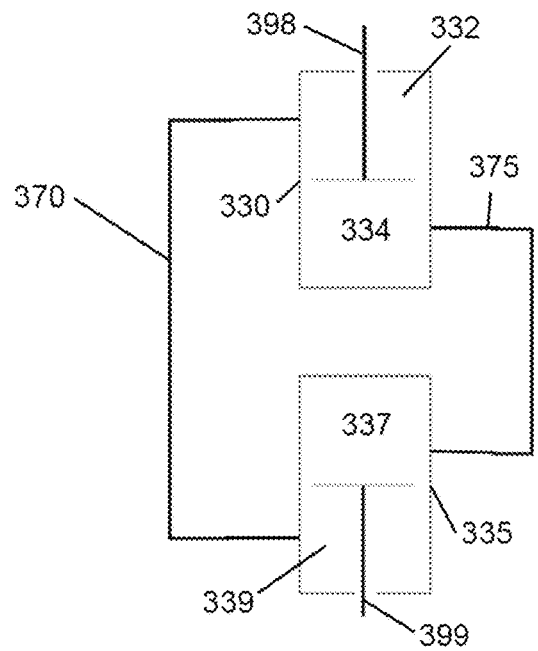
FIG. 3A-D schematically illustrate four different configurations for defining different gas volumes in accordance with some embodiments of the present disclosure.
Figure 3B:
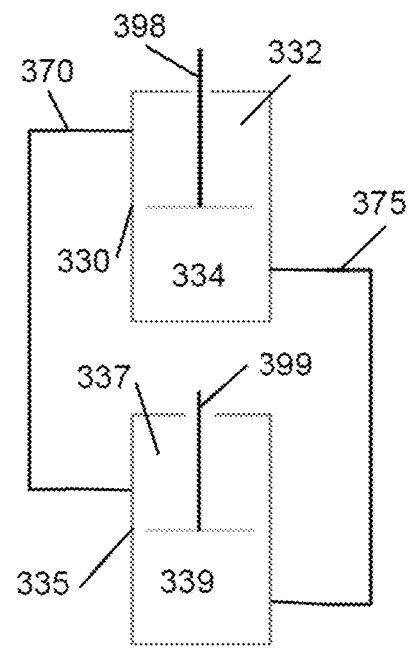
Figure 3C:
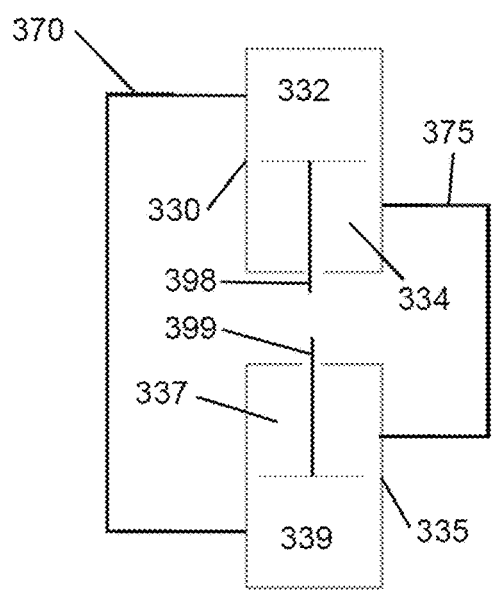
Figure 3D:
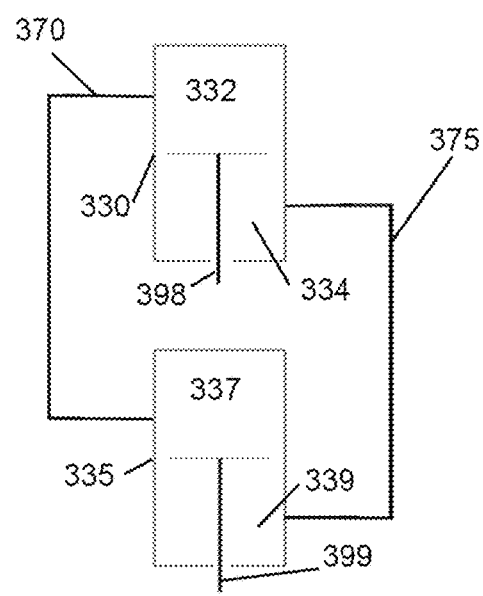

FIGS. 3A-3D illustrate different configurations. In each depicted configuration, the system includes an upper actuator 330 and a lower actuator 335. The upper actuator 330 includes a piston with rod 398, an upper volume 332, and a lower volume 334. The lower actuator 335 includes a piston with rod 399, an upper volume 337, and a lower volume 339. Each configuration further includes a first tube 370 for fluidly connecting one of the volumes of the first actuator 330 to one of the volumes of the second actuator 335 to define a first gas volume; and a second tube 375 for fluidly connecting the other volume of the first actuator 330 to the other volume of the second actuator 335 to define a second gas volume. FIG. 3A depicts the same configuration illustrated in FIG. 2. The configurations of FIGS. 3B-3D differ from the configuration of FIG. 3A in that different gas volumes are fluidly connected and/or the directionality of at least one piston is different.

Pressure is built up in one of the two volumes by rotating the leg forward over the planted foot. When the heel comes up, that pressure is then used to help swing the thigh forward. Equations 1-14 (above) are for the configuration of FIG. 3A. The other configurations will have equations with certain sign changes, and volumes 1 and 2 switched, but in the end they all perform similarly or the same.

In some embodiments, an additional component is included to connect the first air volume to the second air volume. Non-limiting examples include a diaphragm and a spring-loaded double-acting actuator. The additional component may be added by placing connectors (e.g., "T" connectors) on the flexible tubes and adding additional tubing extending from the connectors to the connecting element. The connectors and/or additional component can be placed anywhere and may permit fine-tuning of the pressure-volume relationship in both gas volumes. The additional component may indirectly aid in moving the joints in the exoskeleton through its influence of the pressure-volume relationships.

Figure 4:
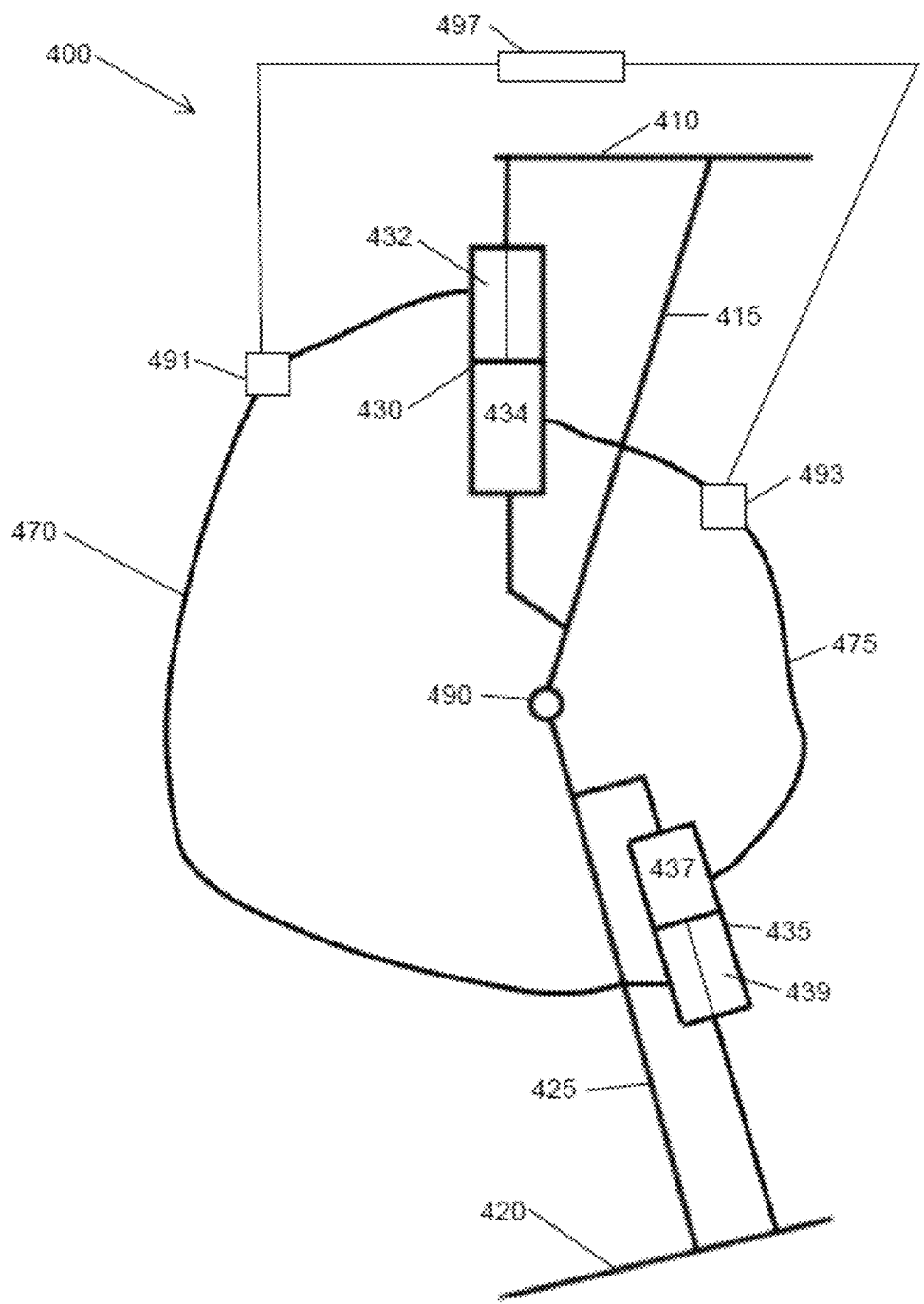
FIG. 4 schematically illustrates another exoskeleton system in accordance with some embodiments of the present disclosure.

A non-limiting embodiment of a system 400 including the additional connecting element is shown in FIG. 4. The system 400 includes a first or upper securing element 410 for securing the system to a patient's limb above a hinge joint and a second or lower securing element 420 for securing the system to the limb below the hinge joint. A hinged connector is included to connect the first and second securing elements 410, 420. The connector includes a first or upper connecting element 415 extending downward from the first securing element 410 and a second or lower connecting element 425 extending upward from the second securing element 420. The first and second connecting elements 415, 425 are connected at a joint 490 which permits hinging of the limb in use.

The system 400 further includes a first or upper actuator 430 and a second or lower actuator 435. The first actuator 430 includes first or upper chamber 432 and second or lower chamber 434. The second actuator 435 includes third or upper chamber 437 and fourth or lower chamber 439.

A first tube 470 connects a chamber of the first actuator 430 to a chamber of the second actuator 435. A second tube 475 connects a chamber of the first actuator 430 to a chamber of the second actuator 435. In the depicted embodiment, the first tube 470 provides fluid communication between the first or upper chamber 432 of the first actuator 430 and the fourth or lower chamber 439 of the second actuator 435; and the second tube 475 provides fluid communication between the second or lower chamber 434 of the first actuator 430 and the third or upper chamber 437 of the second actuator 435.

The exoskeleton system 400 of FIG. 4 differs from the system 200 of FIG. 2 because of the inclusion of the additional component 497 which allows for the fluid communication between the first and second gas volumes. The additional component 497 is connected to the system 400 via additional tubing extending from connectors 491, 493 which are attached to the first tube 470 and the second tube 475, respectively.

Methods for applying the system to a patient are also disclosed. The methods may include taking a series of patient measurements, designing and constructing the customized system based on these measurements, applying the system to the patient, and adjusting one or more parameters. The design parameters may be optimized based on normal human motion instead of varying them based on the impaired motion of the patient. Adjustments may be made based on body size:

Size of the foot plate to match the foot size of the patient.

Length of the exoskeleton components based on the hip-knee and knee-ankle distance in the patient.

Moment arms Ra and Rh were optimal for average adult males and females. These may be scaled to the body height of the patient (e.g., in pediatric applications).

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof. It should also be understood that aspects and features of different embodiments disclosed herein can be combined.

The invention claimed is:

1. A lower-limb exoskeleton system comprising:
a hip or thigh belt;
a foot plate;
an ankle fixture extending from a rear of the foot plate;
a calf brace link comprising:
   an inner leg section extending upward from an inner section of the foot plate;
   an outer leg section extending upward from an outer section of the foot plate; and
   an arced rear section connected to upper portions of the inner leg section and the outer leg section;
a thigh link extending between the hip or thigh belt and an upper portion of the outer leg section;
a first actuator located between the hip or thigh belt and the thigh link;
a second actuator located between the ankle fixture and the rear section of the calf brace link; and
tubing connecting the first actuator and the second actuator;
wherein the lower-limb exoskeleton system does not comprise any battery;
wherein the lower-limb exoskeleton system does not comprise any motor; and
wherein the lower-limb exoskeleton system does not comprise any controller.

2. The lower-limb exoskeleton system of claim 1, wherein the hip or thigh belt comprises a front portion and a rear portion.

3. The lower-limb exoskeleton system of claim 1, wherein the foot plate and the ankle fixture are a unitary structure.

4. The lower-limb exoskeleton system of claim 1, wherein the foot plate and the ankle fixture are connected via at least one fastener.

5. The lower-limb exoskeleton system of claim 1, wherein each of the hip or thigh belt, the foot plate, the ankle fixture, the calf brace link, and the thigh link comprises an aluminum alloy.

6. The lower-limb exoskeleton system of claim 1, wherein the tubing comprises a first tube extending between a top end of the first actuator and a bottom end of the second actuator.

7. The lower-limb exoskeleton system of claim 6, wherein the tubing comprises a second tube extending between a top end of the second actuator and a bottom end of the first actuator.

8. The lower-limb exoskeleton system of claim 7, further comprising:
at least one pressure gauge in fluid communication with the tubing.

9. The lower-limb exoskeleton system of claim 8, wherein the at least one pressure gauge comprises a first pressure gauge in fluid communication with the first tube.

10. The lower-limb exoskeleton system of claim 9, wherein the at least one pressure gauge comprises a second pressure gauge in fluid communication with the second tube.

11. The lower-limb exoskeleton system of claim 1, wherein each of the first actuator and the second actuator is mounted to a rod side pin mount on a first end and a clevis mount on a second end.

12. The lower-limb exoskeleton system of claim 1, wherein the first actuator is located in front of the thigh link.

13. The lower-limb exoskeleton system of claim 1, wherein the second actuator is located behind the calf brace link.

14. The lower-limb exoskeleton system of claim 1, wherein the first actuator is located in front of the thigh link and the second actuator is located behind the calf link.

15. The lower-limb exoskeleton system of claim 1, wherein the first actuator and the second actuator comprise elastic diaphragms.

16. The lower-limb exoskeleton system of claim 1, wherein the first actuator and the second actuator comprise double-acting cylinders.

17. The lower-limb exoskeleton system of claim 1, wherein the tubing comprises a first tube connecting a first chamber of the first actuator to a third chamber of the second actuator and a second tube connecting a second chamber of the first actuator to a fourth chamber of the second actuator.

18. The lower-limb exoskeleton system of claim 17, wherein the first tube, first chamber, and third chamber define a first gas volume; wherein the second tube, second chamber, and fourth chamber define a second gas volume; wherein the first gas volume is pressurized by at least one first check valve permitting ambient air to flow in but not out when a first gas volume pressure is below a first predetermined threshold value; and wherein the second gas volume is pressurized by at least one second check valve permitting ambient air to flow in but not out when a second gas volume pressure is below a second predetermined threshold value.

19. The lower-limb exoskeleton system of claim 17, wherein the first tube, first chamber, and third chamber define a first gas volume; wherein the second tube, second chamber, and fourth chamber define a second gas volume; and wherein the system further comprises:
a diaphragm or a spring-loaded double-acting actuator connecting the first gas volume to the second gas volume.

20. A lower-limb exoskeleton system comprising:
a hip or thigh belt;
a foot plate;
an ankle fixture extending from a rear of the foot plate;
a calf brace link comprising:
   an inner leg section extending upward from an inner section of the foot plate;
   an outer leg section extending upward from an outer section of the foot plate; and
   an arced rear section connected to upper portions of the inner leg section and the outer leg section;
a thigh link extending between the hip or thigh belt and an upper portion of the outer leg section;
a first linear pneumatic actuator located between the hip or thigh belt and the thigh link, the first linear pneumatic actuator having a first side and a second side;
a second linear pneumatic actuator located between the ankle fixture and the rear section of the calf brace link, the second linear pneumatic actuator having a third side and a fourth side;
a first tubing connecting the first side to the third side; and
a second tubing connecting the second side to the fourth side;
wherein the lower-limb exoskeleton system does not comprise any battery;
wherein the lower-limb exoskeleton system does not comprise any motor; and
wherein the lower-limb exoskeleton system does not comprise any control system.

* * * * *